Sept. 2, 1924.
H. W. BUNDY
TUBE AND METHOD OF MAKING TUBES
Filed March 5, 1923    2 Sheets-Sheet 1
1,506,971
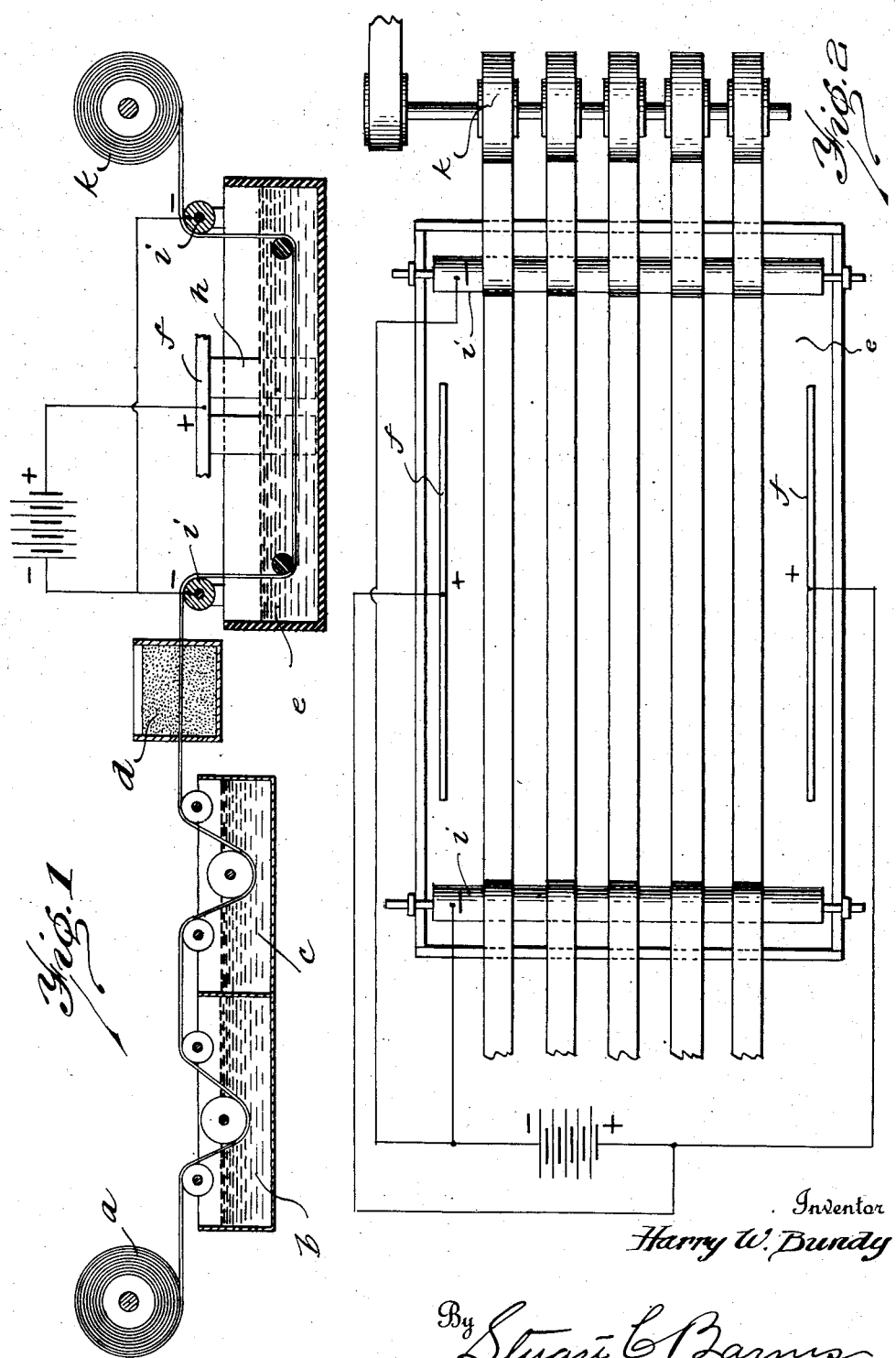
Inventor
Harry W. Bundy
By Stuart C. Barnes
Attorney Sept. 2, 1924.
H. W. BUNDY
1,506,971
TUBE AND METHOD OF MAKING TUBES
Filed March 5, 1923  2 Sheets-Sheet 2
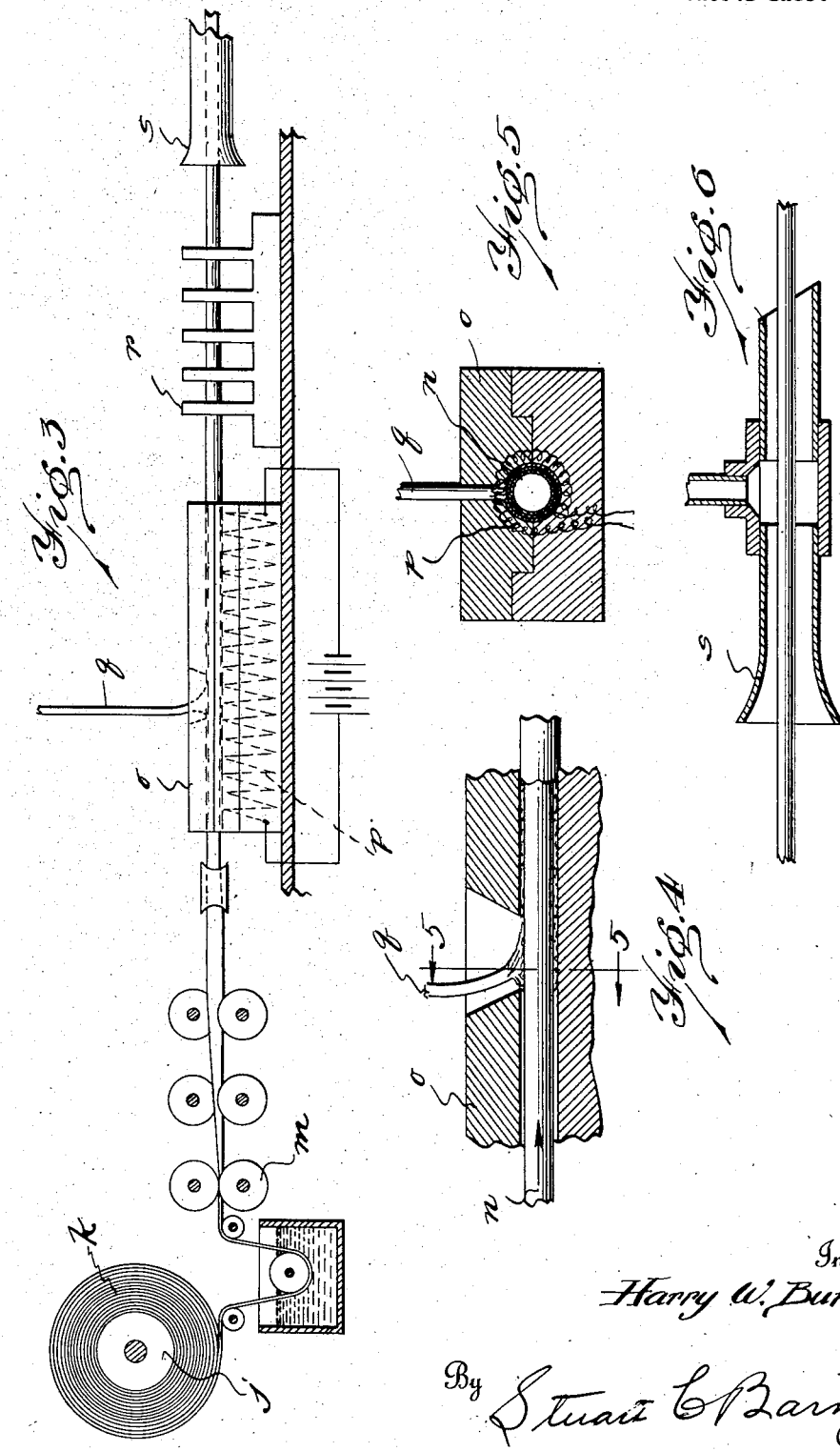
Inventor
Harry W. Bundy
By Stuart C. Barnes
Attorney Patented Sept. 2, 1924.

1,506,971

UNITED STATES PATENT OFFICE.

HARRY W. BUNDY, OF DETROIT, MICHIGAN.

TUBE AND METHOD OF MAKING TUBES.

Application filed March 5, 1923. Serial No. 622,849.

*To all whom it may concern:*

Be it known that I, HARRY W. BUNDY, a citizen of the United States, residing at Detroit, in the county of Wayne and State of Michigan, have invented certain new and useful Improvements in Tubes and Methods of Making Tubes, of which the following is a specification.

This invention relates to the manufacture of tubes and has in view both an improved tube and method. The tube comprises a multiple ply tube in which the plies are cemented together by a high fusing point metal electrically deposited. The process involves the various steps by which tubes of this character can be successfully made.

In my prior Patent No. 1,431,368, I have described and broadly claimed a tube and a process for manufacturing the same. This tube is a multiple ply tube cemented together by solder or other metal deposited by contact. The claims in this patent cover broadly a longitudinally drawn and fashioned multiple-ply tube with the plies secured together by an interposed metal. However, the specific embodiment of the invention there shown is a small flexible brass or copper tubing intended for gasoline lines and radiator tubes used on automobiles. The plies are coated with solder or other metal by the physical process of painting the solder thereon, or drawing the strip through a bath of solder. This method of coating can be used with low fusing point cementing metals such as solder. However, tube in which the plies are cemented together with a low fusing point metal is not suitable for use in the presence of relatively great heat. For instance, tube of this kind could not be used for exhaust pipes of automobile engines as the solder would fuse and the plies disengage. Furthermore, solder is not a very strong adhesive for use on heavy guage and large diameter tubes. Tube of this kind is ordinarily now made either in the form of seamless tube or welded tube usually by autogeneous welding, either electrically or by oxy-acetylene gas. This welded tube is somewhat expensive due to the cost of oxygen and acetylene gases and electric energy. Tube has also been butt-brazed but a tube of this kind is not very strong and has a very limited field of usefulness.

It is therefore the object of the present invention to provide the larger sizes of gages of tube in the form of a multiple-ply brazed tube, or more broadly considered, in a multiple-ply tube cemented together by an encircling film of high fusing point cementing metal. Again, more specifically considered, the finished tube and the method are both new inasmuch as the cementing metal is united with the metal stock of the plies by an electro-depositing action as distinguished from a physical action. This gives a very much better adhesion between the two different kinds of metals used. Furthermore, so far as the process is concerned, the electro-plating simplifies the process of coating the strip of stock with the metal cement.

In the drawings:

Fig. 1 is a diagrammatic sectional view of the electro-plating apparatus.

Fig. 2 is a plan view of the same.

Fig. 3 is a diagrammatic sectional view of the tube forming and sweating apparatus.

Fig. 4 is a longitudinally fragmentary section of the sweating die.

Fig. 5 is a cross-section of the same taken on the line 5—5 of Fig. 4.

Fig. 6 is a fragmentary longitudinal section of the water-cooling dell or jacket.

Referring to Fig. 1, a diagrammatical view of the electro-plating apparatus will be seen. It will be obvious that the method can be one continuous operation, the strip passing from the electro-plating bath directly into the forming rolls shown in Fig. 3. However, for reasons of economy and speed in manufacture, I find it advantageous to make the operations separate. A plurality of strips can be simultaneously electro-plated as shown in Fig. 2, hence the electro-plating will not hold up the speed of the tube forming and sweating machine. The tube forming and sweating machine can be operated at very much greater speed than either oxy-acetylene or electric welding machines. These welding machines are limited in speed by reason of having to go slowly enough to permit the heat to completely melt and fuse the metal edges autogeneously. Brazing is a very common substitute for welding for the very reason that it is much less expensive and much speedier because it does not require the intense heat that welding does.

Adverting again to the electric-plating operation the stock supported on the coil *a* is drawn down into a cleaning acid bath *b*, which may be muriatic acid or any other suitable cleaning acid, which serves to remove oil, rust, or any other soil from the face of the metal strip. This metal strip is preferably a steel strip; it then passes through the hot water bath $c$ which serves to wash off the acid. It is then drawn through a saw-dust wiping box $d$ which serves to wipe off the surplus acid and water.

The strip then passes through an electrolytic bath $e$. One of the poles of the electric circuit comprises a bar $f$ on which is adapted to hang the brass metal or other hard solder strips $h$. The other pole of the electric circuit is connected to one of the rolls $i$ over which the strip passes, preferably this pole is divided into two poles and each roll $i$ is connected with the pole. This makes a better electric connection. The deposit of the brazing compound or other metal will be uniformly and evenly distributed and will require no brushing or wiping or equalizing operations as required in treating a strip with a coat of soft solder or similar metal that is deposited thereon by a physical action. I find that copper will make a satisfactory substitute for the brazing material if this is desired.

As I have already stated, I prefer to roll up the electro-plated stock in the form of coils $k$ which can be transferred to the stock spool $j$ of the tube forming machine. Here the stock is drawn off from the stock spool and through a bath of fluxing acid such as borax, thence it passes between the tube forming rolls $m$ which form it up into a two-ply strip $n$ such as shown in Fig. 5. These tube forming rolls can be designed by any competent tube mill designer and hence the details are not here given but the rolls are simply shown diagrammatically.

The tube then passes through a sweating die $o$. However, from a broad standpoint, all that is necessary is that it be subjected to a heat approximating the heat used in ordinary brazing operations. This is considerably higher than the heat necessary in the sweating die shown in my prior Patent No. 1,431,368. This may be furnished either by such a die as I have shown in Figs. 4 and 5, in which is an electric heating element $p$, or from a broad standpoint, it could be furnished by any open flame of sufficient intensity such as an oxy-acetylene flame.

I find it useful to feed into the sweating die $o$ a strip of brass wire $q$. However, this is not absolutely essential, but secures a better adhesion, I believe, for the reasons stated in my Patent No. 1,465,755 wherein is described and claimed a process for feeding a strip of this kind through the tube in sweating operation.

After the tube has passed through the sweating zone, it passes through a reducing, scraping and sizing die $r$ and thence into the water cooling bell $s$, which serves to set the metal cement.

The tube made by this process has different physical characteristics revealed in the final product from the tube described and claimed in my aforementioned patent. A hard form of solder, such as brazing material may be used, and this has a higher fusing point and consequently makes the tube adaptable for purposes for which the tube described in my prior patent would not be available. Moreover, the electro-deposition of metal secures quite a different physical cohesion, and in some cases a chemical cohesion, between the cementing metal and the metal plies. With the electro-deposition of metal, in a great many cases, very much better cohesion and union is afforded between the deposited metal and the plate, than is possible by the physical contact method of deposition. With a great many of the metals it will be found that the first film of electro-deposited metal alloys itself with the surface metal on the plate, due to the electro and chemical actions that take place in electrolysis. As more of the plating metal is deposited the alloy grows thicker and thicker until further deposits are composed of the depositing metal alone.

It will be obvious that with metals that have this facility of alloying under electroplating action, that a very much superior adhesion exists, and that when by the sweating operation, cohesion is established between the two electro-plated films, that the joint is a very much stronger one than is possible with substances which adhere to each other only by physical contact. From this description it will therefore be evident that the process is capable of handling heavy rough stock to better advantage than the process described in my prior patent. It will also be evident that the finished product reveals physical characteristics and chemical results not found in the product described in my prior patent.

Electro-plating of course is a process, and to say that substance is electro-plated on another substance is, in a sense, to describe the product by the process of manufacture; but, be it remembered, that in every case, the process of manufacture is revealed in the final product and no other adequate words are available to describe physical and chemical results that actually do exist in the finished product.

In the claims it is recited that the metal strip stock is fashioned into "a plural-ply hollow cross-section," or words to a similar effect. Plural-ply is used here in the sense that the entire cross-section or a portion of the cross-section has plural plies, for it will be obvious that measurably good results could be accomplished by having the plural-ply go only part way around and still come within the spirit of my invention.

What I claim is:

1. A tube, comprising metal strip stock longitudinally drawn and fashioned into a plural-ply hollow cross-section having a longitudinally running seam, the plies being united by a high fusing point metal material electro-deposited on the surfaces of the ply stock.

2. A tubing, comprising a strip of steel stock longitudinally drawn and fashioned with a longitudinally running seam into a plural-ply cross-section with the plies united by an electro-deposited and sweated brazing material.

3. The method of manufacturing tube, which comprises the passing of a strip of strip metal through an electrolytic bath of brazing material to deposit a film of brazing material thereon, then the fashioning of said strip into a plural-ply cross-section tube while longitudinally traveling, and then heating such tube to fuse the interposed brazing material and cause the plies to adhere together.

4. The method of manufacturing tube, which comprises the electroplating of a strip of metal with a brazing material, then fashioning said strip into a plural-ply cross-section tube, then heating such tube and simultaneously feeding additional brazing material in at the seam.

5. The method of manufacturing tube, which comprises the passing of a strip of metal through an electrolytic bath of brazing material, then fashioning said strip into a plural-ply cross-section tube while longitudinally traveling, and while so longitudinally traveling heating said tube to a brazing heat and feeding a brass wire to the seam to be melted thereover.

In testimony whereof I affix my signature.

HARRY W. BUNDY.